(12) United States Patent  (10) Patent No.: US 9,141,288 B2
Vasavi et al.  (45) Date of Patent: Sep. 22, 2015

(54) CHARGEBACK BASED STORAGE RECOMMENDATIONS FOR DATACENTERS

(75) Inventors: Sagi Vasavi, Karnataka (IN); Rajashekar Dasari, Andhra Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 423 days.

(21) Appl. No.: 13/559,077

(22) Filed: Jul. 26, 2012

(65) Prior Publication Data

US 2014/0032872 A1 Jan. 30, 2014

(51) Int. Cl.
*G06F 3/06* (2006.01)
*H04W 72/10* (2009.01)
*H04W 72/12* (2009.01)

(52) U.S. Cl.
CPC .......... *G06F 3/0605* (2013.01); *G06F 3/0653* (2013.01); *G06F 3/0685* (2013.01); *H04W 72/10* (2013.01); *H04W 72/1247* (2013.01)

(58) Field of Classification Search
CPC ... G06F 3/0605; G06F 3/0653; G06F 3/0685; H04W 72/06; H04W 72/10; H04W 72/1247
USPC .................................................. 711/154, 162
See application file for complete search history.

(56) References Cited

U.S. PATENT DOCUMENTS

| 8,046,537 B2* | 10/2011 | Carr et al. ..................... 711/117 |
| 2007/0130236 A1 | 6/2007 | Seeger et al. |
| 2008/0168228 A1* | 7/2008 | Carr et al. ..................... 711/117 |
| 2011/0106862 A1 | 5/2011 | Mamidi et al. |
| 2013/0084878 A1* | 4/2013 | Chen et al. ................. 455/452.1 |
| 2013/0117515 A1* | 5/2013 | Ashmore et al. ............. 711/162 |

OTHER PUBLICATIONS

"Symantec Helps Data Center Managers Work Smarter Not Harder with Storage Foundation HA," < http://www.symantec.com/about/news/release/article.jsp?prid=20101012_01 >. Oct. 12, 2010. 3 pages.

"Increasing IT Efficiency in a Dynamic Datacenter with a Virtualized Storage Solution," < http://www.storageexpencenter.com/document/1309275914_732 >. Apr. 2010. 21 pages.

(Continued)

*Primary Examiner* — Mardochee Chery
(74) *Attorney, Agent, or Firm* — Brooks, Cameron & Huebsch, PLLC

(57) ABSTRACT

Systems, computer readable media, and methods are provided. An example method can include classifying a plurality of storage mapping systems as a plurality of storage tiers in a datacenter, assigning a chargeback level to each of the plurality of storage tiers, analyzing a plurality of storage volumes of a plurality of servers in the datacenter to obtain characteristics of each of the plurality of storage volumes where the characteristics include one of the plurality of storage mapping systems, assigning the chargeback level to each of the plurality of storage volumes based on the storage mapping system for each of the plurality of storage volumes, and determining a storage recommendation for a number of configuration item (CIs) based on a criticality of the number of CIs where the criticality corresponds to at least one of the chargeback levels assigned to each of the plurality of storage tiers.

20 Claims, 3 Drawing Sheets

(56) References Cited

OTHER PUBLICATIONS

Harker, J. et al. "Dynamic Storage Tiering: the Integration of Block, File and Content," < http://www.hds.com/assets/ pdf/hitachi-white-paper-dynamic-storage-tiering.pdf >. Sep. 2010. 17 pages.

ISE Analyzer-Software for Better Storage Insight. < http://xiostorage.com/products/ise-software/#ise_analyzer_tab >. Accessed Jul. 2012. 2 pages.

* cited by examiner

CHARGEBACK BASED STORAGE RECOMMENDATIONS FOR DATACENTERS

BACKGROUND

A datacenter may refer to computational resources related to data storage. The datacenter may include computer networks, for instance, cloud networks to connect portions of the datacenter. Data may be stored on servers within the datacenter.

DETAILED DESCRIPTION

Figure 1:
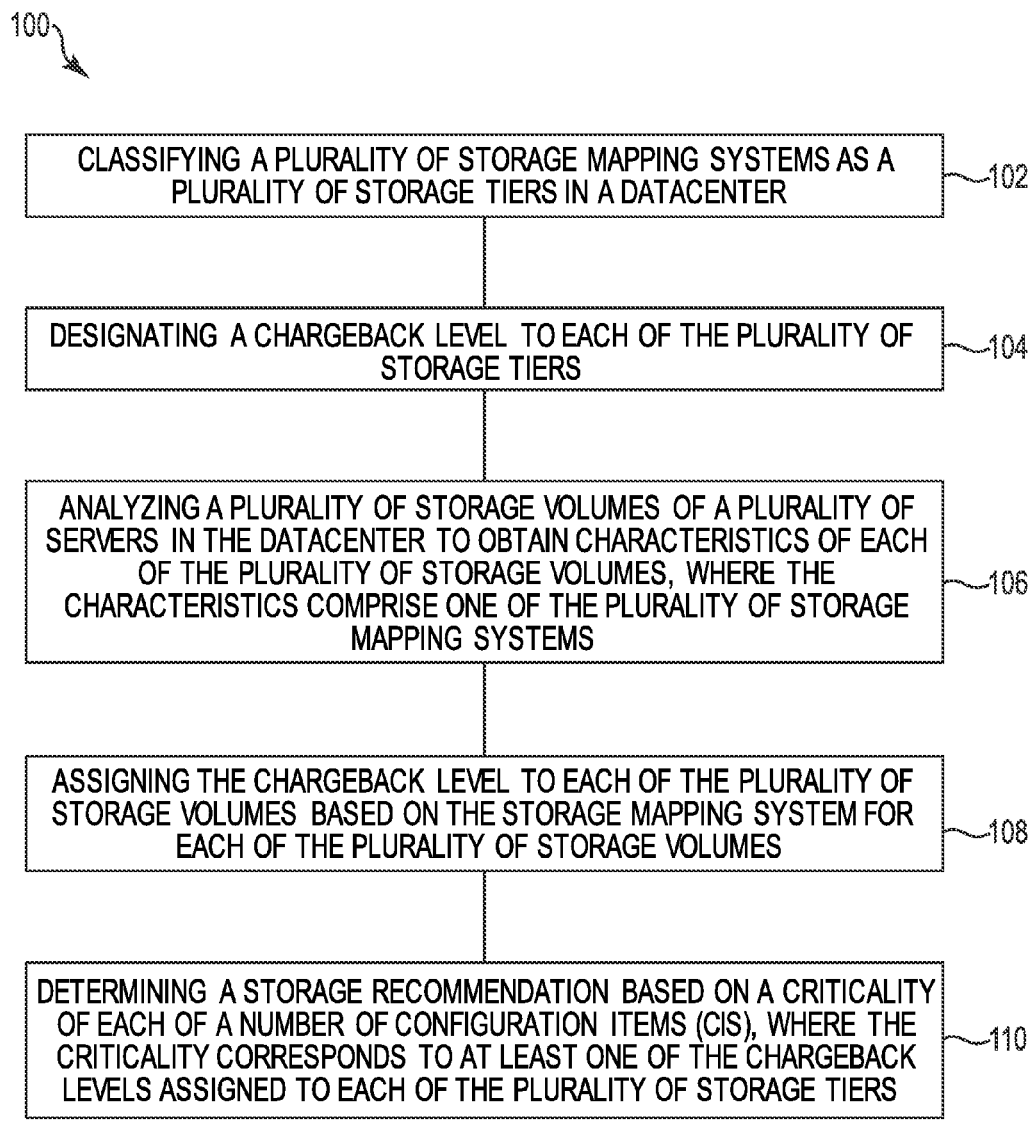
FIG. 1 illustrates a block diagram of an example method to provide storage recommendations for datacenters according to the present disclosure.

With increasing pressure on organizations to improve performance the organizations may seek to increase efficiency associated with data storage, for instance, by pursuing storage of data in the most appropriate location. That is, a location (e.g., a disk) that satisfies an individual configuration item (CI) and/or organizational preferences (e.g., a business unit utilizing the CI) while still maintaining a comparatively low cost associated with the data storage. The CI and/or organizational preferences can, for example, include a baseline (e.g., a minimum) data transfer rate, a baseline redundancy level, a baseline restore rate, and/or a cost (e.g., a maximum cost) associated with storage of the CI.

A datacenter can include a plurality of servers for data storage. It can be useful to assign portions of the plurality of servers into a plurality of storage tiers to enable allocation of a plurality of storage volumes (e.g., a plurality of disks of the plurality of servers) based on constraints (e.g., the CI and/or organizational preferences) associated with a number of CIs. That is, each of the plurality of storage tiers and, consequently, a plurality of storage volumes of the plurality of storage tiers, can be vary in performance (e.g., a data transfer rate, among other performance parameters). Hence, each storage tier can vary in cost (e.g., based on comparative performance of each tier in the plurality of storage tiers), thereby forming a cost-based hierarchy of storage tiers. This can enable maximizing a rate of return related to an individual server in the plurality of servers by enabling storage of the number of CIs at a tier of the plurality of storage tiers that meets the constraints associated with the number of CIs (e.g., a number of available storage volumes of the plurality of servers) while maintaining an associated cost within a specified range (e.g., a monetary range specified by the organization).

Such a hierarchy of the plurality of storage tiers can enable data storage based on the constraints. However, the determination of storage locations that satisfy the constraints can be expensive (e.g., time-consuming). For example, one approach for assigning data to a hierarchy requires forecasting (e.g., by a server administrator) future storage demands in an effort to allocate just enough space (e.g., a number of available disks of one of the plurality of servers) in a number of respective levels of the plurality of servers to satisfy client demands associated with the number of CIs. This can be time consuming and/or problematic, especially if a forecast proves to be inaccurate. Moreover, as the number of CIs (e.g., a plurality of applications) increases, so to does the complexity of forecasting the future storage demand and determining available storage locations that satisfy the forecasted future storage demand. For example, a datacenter can have a plurality of servers that can be, for instance, a thousand servers. Forecasting demand for such a plurality of servers can be too expensive (e.g., time-consuming) and/or difficult due to the changing nature of an environment (e.g., addition and/or removal of servers from the plurality of servers or shifting of the client demands).

In contrast, examples of the present disclosure can analyze a plurality of servers (e.g., a plurality of cloud servers) and provide a storage recommendation based on criticality, as described herein, of the number of CIs, which enables both efficient and/or real-time criticality based storage of data (e.g., the number of CIs) on the number of selectable available storage volumes within the plurality of servers.

Examples of the present disclosure include methods, systems, and computer-readable and executable instructions to provide storage recommendations for datacenters. An example of a method to provide storage recommendations for datacenters includes classifying a plurality of storage mapping systems as a plurality of storage tiers in a datacenter, designating a chargeback level to each of the plurality of storage tiers, analyzing a plurality of storage volumes of a plurality of servers in the datacenter to obtain characteristics of each of the plurality of storage volumes. For example, the characteristics can include one of the plurality of storage mapping systems. In various examples, the method can include assigning the chargeback level to each of the plurality of storage volumes based on the storage mapping system for each of the plurality of storage volumes, and/or determining a storage recommendation for a number of configuration items (CI) based on a criticality of the number of CIs. In various examples, the criticality can correspond to at least one of the chargeback levels assigned to each of the plurality of storage tiers.

As described herein, the plurality of servers can be applications, operating systems, computers, and/or appliances for storing data (e.g., on the plurality of storage volumes). For example, a cloud server can include a virtual process server associated with a number of virtual machines and/or a number of databases in a cloud system, as described herein.

As described herein, plurality of storage volumes can include volatile and/or non-volatile storage (e.g., memory). Volatile storage can include storage that depends upon power to store information, such as various types of dynamic random access memory (DRAM), among others. Non-volatile storage can include storage that does not depend upon power to store information. Examples of non-volatile storage can include solid state media such as flash memory, electrically erasable programmable read-only memory (EEPROM), phase change random access memory (PCRAM), magnetic storage such as a hard disk, tape drives, floppy disk, and/or tape storage, optical discs, digital versatile discs (DVD), Blu-ray discs (BD), compact discs (CD), and/or a solid state drive (SSD), etc., as well as other types of computer-readable media.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As will be appreciated, elements shown in the various examples herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features. In addition, "for example" and similar phrasing is intended to mean, "by way of example and not by way of limitation"

FIG. 1 illustrates a block diagram of an example method 100 to provide storage recommendations for datacenters according to the present disclosure. As shown at block 102, a plurality of storage mapping systems can be classified as a plurality of storage tiers in the datacenter. The storage mapping systems can be hardware (e.g., a tiering controller) and/or software used to track and/or transfer data to and/or from a plurality of storage volumes. For example, each of the plurality of storage volumes can be identified by a specific name (e.g., disk 1) and/or by a corresponding storage mapping system for data allocation, among other ways of identifying the each of the plurality of storage volumes.

The plurality of storage mapping systems can include, but are not limited to, Hewlett Packard (HP) XP®, HP EVA®, HP MSA®, and EMC CLARiiON®), among others. In some examples, each of the plurality of storage tiers can include one of the plurality of storage mapping systems. The plurality of storage volumes can be mapped (e.g., tracked and/or have data allocated to and/or from) by a number of storage mapping systems. In some examples, the storage tiers can be created by the plurality of storage mapping systems.

At 104, a chargeback level can be designated to each of the plurality of storage tiers in the datacenter. For instance, the chargeback level can be a rate to obtain access (e.g., data storage) to at least one of the plurality of storage tiers. For example, payment of a particular monthly subscription fee from among a range of monthly subscription fees can enable a user to access at least one of the plurality of storage tiers. Hence, the plurality of storage tiers can be classified individually, for example, according to a chargeback level associated with each of the plurality of storage tiers.

At 106, the plurality of storage volumes of a plurality of servers in the datacenter can be analyzed to obtain characteristics of each of the plurality of storage volumes. In various examples, the characteristics can include one of the plurality of storage mapping systems. The characteristics can further include a size, the mapped storage system, and/or a redundancy, as described herein, among others.

As described herein, redundancy is a measure of the number of times a particular item of data and/or group of data is stored (e.g., on the plurality of servers). Redundancy can include storing the data in a number of redundant arrays of independent disks (RAID) levels that combine multiple disk drive components (e.g., the plurality of storage volumes) into a logical group that stores the data, as described herein. A number of standard levels can be employed (e.g., a RAID 1 level) and/or the number of standard levels can be modified, for example, by nesting, among other modifications to provide the desired redundancy and/or performance. Alternatively or in addition, a numerical indicator can be associated with each of the number of storage volumes to identify a number of storage volumes (e.g., at other disk and/or server locations) that redundantly store the data located on the plurality of storage volumes.

At 108, the chargeback level to each of the plurality of storage volumes based on the storage mapping system for each of the plurality of storage volumes can be assigned. At 110, a storage recommendation for a number of configuration items (CI) based on a criticality of each of the number of CIs can be determined. In various examples, the criticality can correspond to at least one of the chargeback levels assigned to each of the plurality of storage tiers.

In some examples, determining the storage recommendation can include recommending a number of available storage volumes of the plurality of servers. In some examples, the plurality of available storage volumes can have the chargeback level equal to or in excess of the criticality of the number of CIs. Additionally, in some examples, the volume group can be a logical volume (e.g., a group of the number of selectable available storage volumes) that can include at least a portion of the plurality of available storage volumes. In some examples, determining the recommendation based on the criticality of the number of CIs can include recommending a hierarchy of a number of selectable available storage volumes based on the chargeback level, as described herein.

Alternatively or in addition, in some examples, determining the storage recommendation can include recommending a change in the chargeback level for an existing volume group. The existing volume group can be analyzed following a change in environment and/or periodically, as described herein.

In some example, a threshold capacity of the number of CIs can be assigned to each of the plurality of servers. As described herein, a threshold capacity of the number of CIs is an upper number of the number of CIs assignable to an individual component, for example, a server. For example, the threshold capacity can be an amount (e.g., the number of CIs) that can be equal to or less than the capacity of one of the plurality of servers.

As described herein, criticality is a measure of importance of the number of CIs. For example, the criticality of each of the number of CIs can be selected from a group of levels (e.g., in decreasing order of criticality) including critical, high, medium, and/or low, among others. For example, a CI or a number of CIs with a comparatively high criticality can be stored at a number of tiers (e.g., at a plurality of storage volumes) with a comparatively faster response time (e.g., a data transfer rate) and/or a higher level of redundancy.

Accordingly, a CI or a number of CIs with a comparatively low criticality can be stored at storage tiers with a comparatively slow response time and/or a comparatively low redundancy. Importance can be determined by the nature (e.g., purpose) of the CI or the number of CIs, the nature of the business unit utilizing the CI or the number of CIs, and/or the specified (e.g., by a user and/or business unit). For example, a CI or a number of CIs with an otherwise comparatively low criticality can be designated as having a high criticality if the business unit utilizing the CI or the number of CIs itself has a high criticality (e.g., designates the CI or the number of CI with a high criticality). This can enable a particular CI used by multiple business units (e.g., an organization), for example, to vary in criticality (e.g., chargeback level) from a first business unit to a second business unit of the multiple business units.

As described herein, the number of CIs can include software, hardware, and/or network connections associated with a number of business units. For example, the number of CIs can include applications, nodes, databases, and/or processors, among others. The number of CIs can be stored in databases, as described herein. For example, a database can include a central configuration management database (CMDB). A CMDB, for example, can store the number of CIs and/or information (e.g., the CI and/or organizational preferences) relating to the number of CIs.

Figure 2:
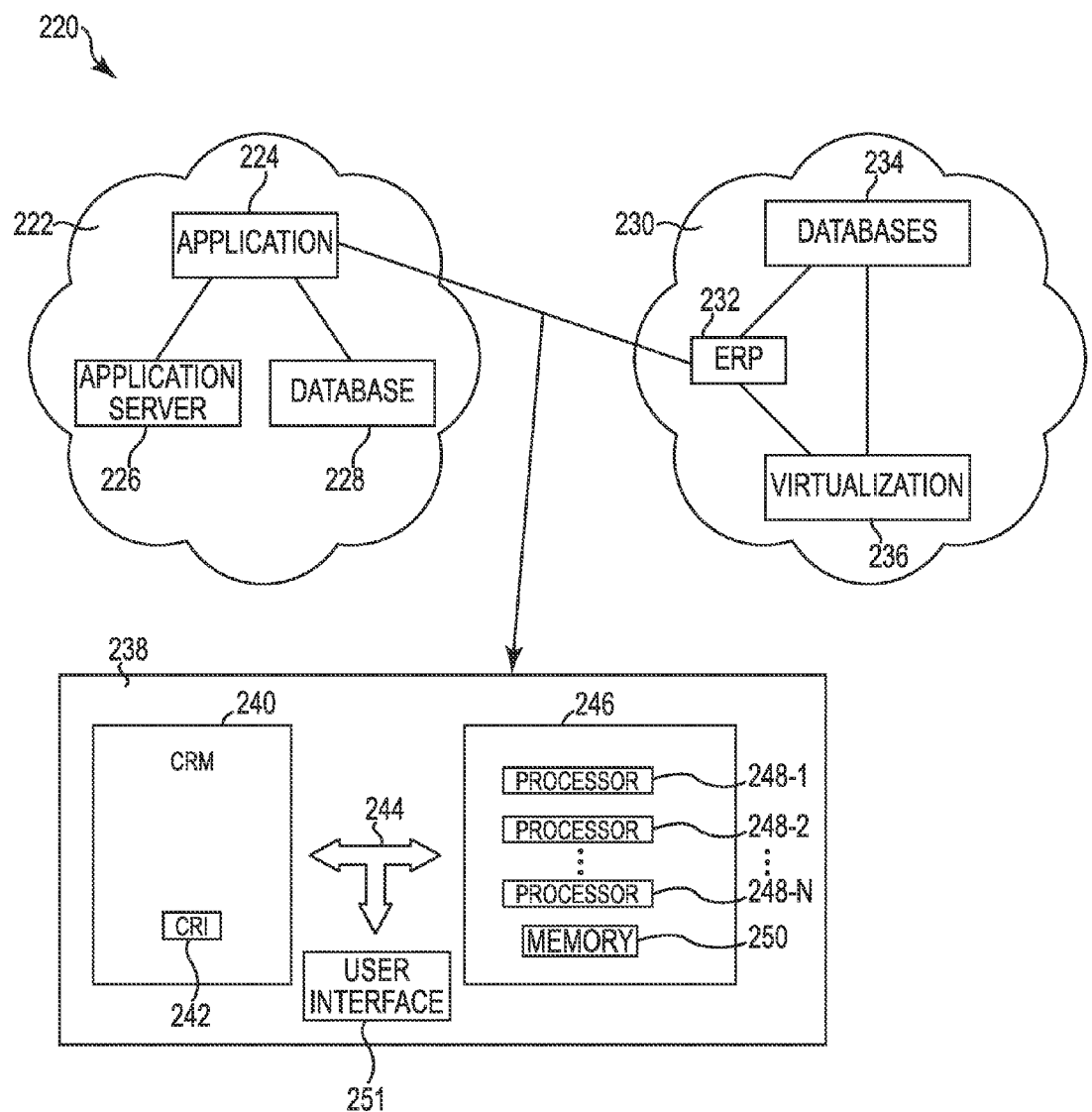
FIG. 2 illustrates a block diagram of an example system to provide storage recommendations for datacenters according to the present disclosure.

FIG. 2 illustrates a block diagram of an example system to provide storage recommendations for datacenters according to the present disclosure. In some examples, the system 220 can include a number of cloud systems (e.g., 222, 230). In some examples, the number of clouds can include a public cloud system 222 and a private cloud system 230. For example, an environment (e.g., an IT environment) can include a public cloud system 222 and a private cloud system 230 that can include a hybrid environment and/or a hybrid cloud. A hybrid cloud, for example, can include a mix of physical server systems and dynamic cloud services (e.g., a number cloud servers). For example, a hybrid cloud can involve interdependencies between physically and logically separated services consisting of multiple systems. A hybrid cloud, for example, can include a number of clouds (e.g., two clouds) that can remain unique entities but can be bound together.

The public cloud system 222, for example, can include a number of applications 224 (e.g., CIs), an application server 226, and a database 228. A public cloud system 222 can include a service provider that makes a number of resources (e.g., a number of CIs and/or storage) available to the public over the Internet. The public cloud system 222 can be free or offered for a fee. For example, the number of applications 224 can include the number of resources available to the public over the Internet. A user can access a cloud-based CI (e.g., an application) through the number of applications 224 (e.g., via an internet browser). An application server 226 in the public cloud system 222 can include a virtual machine. A database 228 in the public cloud system 222 can include a database that runs on a cloud computing platform (e.g., a recommend computing device, as described herein).

The private cloud system 230 can, for example, include an Enterprise Resource Planning (ERP) system 232, a number of databases 234, and virtualization 236 (e.g., virtual machines). For example, the private cloud system 230 can include a computing architecture that provides hosted services to a limited number of nodes (e.g., computer) behind a firewall. The ERP 232, for example, can integrate internal and external CI information across an entire business unit and/or organization. The number of databases 234 can include an event database, an event archive, a CMDB, and/or a performance metric database, among other databases. Virtualization 236 can, for example, include the creation of a number of virtual resources, such as a hardware platform, a operating system, a storage device, and/or a network resource, among others.

The public cloud system 220 and the private cloud system 230 can be bound together, for example, through one or more of the number of applications 224 in the public cloud system 220 and the ERP 232 in the private cloud system 230.

The system 220 can include a recommend computing device 238 (e.g., an IT computing device, a system computing device, and/or a manufacturing computing device) having a memory and processing resources with instructions (e.g., computer-readable instructions (CRI) 242) stored in the memory and executed by the processing resources to provide storage recommendations for datacenters. As described herein, the recommend computing device 238 can be any combination of hardware and/or program instructions (e.g., CRI) configured to provide storage recommendations for datacenters. The hardware, for example, can include a user interface 251 (e.g., a graphical user interface) and/or one or more processing resources 248-1, 248-2 ... 248-N, a computer readable medium (CRM) 240, etc. The program instructions can include instructions stored on the CRM 240 that are executable by the one or more processing resources to implement one or more of the various functions, or specific acts, as described herein.

Figure 3:
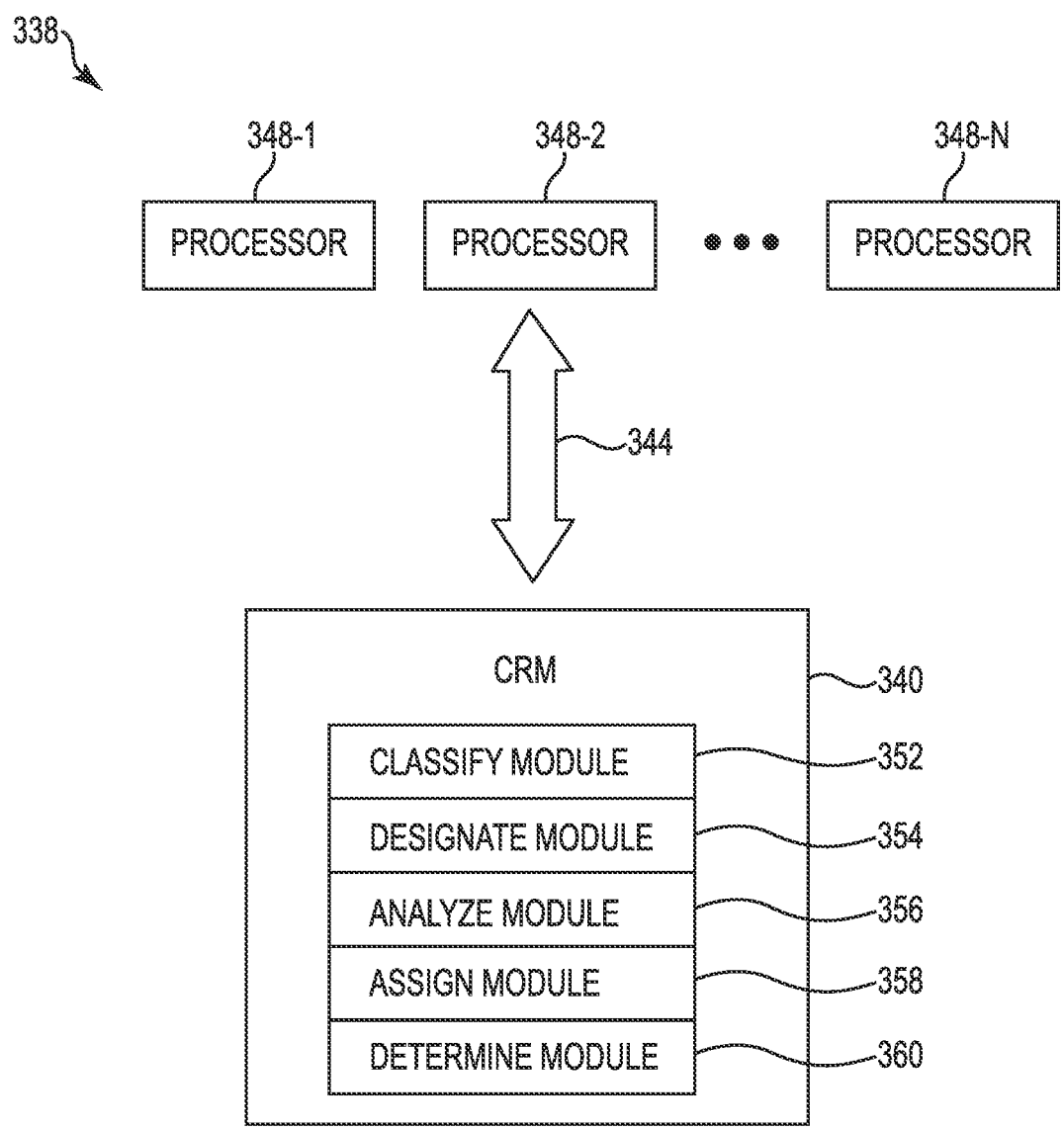
FIG. 3 illustrates a diagram of an example computing system to provide storage recommendations for datacenters according to the present disclosure.

The recommend computing device 238 can include the CRM 240 in communication with the processing resources 248-1, 248-2 ... 248-N. CRM 240 can be in communication with a computing device 246 (e.g., a Java® application server, among others) having processing resources of more or fewer than 248-1, 248-2 ... 248-N. The computing device 246 can be in communication with a tangible non-transitory CRM 240 storing a set of computer-readable instructions (CRI 242) executable by one or more of the processing resources 248-1, 248-2 ... 248-N, as described herein. The CRI 242 can also be stored in remote memory managed by a server and/or represent an installation package that can be downloaded, installed, and executed. The CRI 242, for example, can include a number of modules as shown in FIG. 3. The computing device 246 can include memory resources 250, and the processing resources 248-1, 248-2 ... 248-N can be coupled to the memory resources 250.

Processing resources 248-1, 248-2 ... 248-N can execute CRI 242 that can be stored on an internal or external non-transitory CRM 240. The processing resources 248-1, 248-2 ... 248-N can execute CRI 242 to perform various functions, including the functions described herein. For example, the processing resources 248-1, 248-2 ... 248-N can execute CRI 242 to provide storage recommendations for datacenters. A non-transitory CRM (e.g., CRM 240), as used herein, can include volatile and/or non-volatile storage (e.g., memory), as described herein.

The non-transitory CRM 240 can be integral, or communicatively coupled, to the computing device 246, in a wired and/or a wireless manner. For example, the non-transitory CRM 240 can be an internal memory, a portable memory, a portable disk, or a memory associated with another computing resource.

The CRM 240 can be in communication with the processing resources 248-1, 248-2 ... 248-N via the communication path 344. The communication path 344 can be local or remote to a machine (e.g., a computing device 246) associated with the processing resources 248-1, 248-2 ... 248-N. Examples of a local communication path 344 can include an electronic bus internal to a machine (e.g., a computer) where the CRM 240 is one of volatile, non-volatile, fixed, and/or removable storage medium in communication with the processing resources 248-1, 248-2 ... 248-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 344 can be such that the CRM 240 can be remote from the processing resources e.g., 248-1, 248-2 ... 248-N, such as in a network connection between the CRM 240 and the processing resources (e.g., 248-1, 248-2 ... 248-N). That is, the communication path 344 can be a network connection. Examples of such a network connection can include a local area network (LAN), wide area network (WAN), personal area network (PAN), and the Internet, among others. In such examples, the CRM 240 can be associated with a first computing device and the processing resources 248-1, 248-2 ... 248-N can be associated with a second computing device (e.g., computing device 246). For example, processing resources 248-1, 248-2 ... 248-N can be in communication with a CRM 240. For instance, the CRM 240 can include a set of instructions and the processing resources 248-1, 248-2 ... 248-N can be designed to carry out the set of instructions to provide storage recommendations for datacenters (e.g., for a datacenter in an environment), as described herein. For example, such an environment can include a public cloud system (e.g., 222) and/or a private cloud system (e.g., 230).

In various examples, the processing resources 248-1, 248-2 ... 248-N coupled to the memory resources 250 can execute program instructions to enable the recommend computing device 238 to classify a plurality of storage mapping systems as a plurality of storage tiers in a datacenter, assign a chargeback level to each of the plurality of storage tiers, analyze a plurality of storage volumes of a plurality of servers in the datacenter to obtain characteristics of each of a plurality of storage volumes, where the characteristics include a storage mapping system for each of the plurality of storage volumes, and/or assign a chargeback level to each of the plurality of storage volumes based on the storage mapping system for each of the plurality of storage volumes.

Additionally, in various examples, the processing resources 248-1, 248-2 ... 248-N coupled to the memory resources 250 can execute program instructions to enable the recommend computing device 238 to determine a storage recommendation for a number of configuration items (CI) based on a criticality of the number of CIs. For example, the criticality can correspond to at least one of the chargeback levels assigned to each of the plurality of storage tiers. This can enable determining the recommendation that, in various examples, can include to determine a hierarchy of a number of selectable available storage volumes based on the chargeback level.

The hierarchy of the number of selectable available storage volumes, for example, at a medium chargeback level, can include all available storage volumes included in the plurality of tiers satisfying the medium chargeback level (e.g., silver/tier 3 and gold/tier 2), as described herein. In some examples, a user can select the number of selectable available storage volumes (e.g., disks of the plurality of servers) from the hierarchy to meet the criteria, for example size (e.g., number of gigabytes) for storage of the number of CIs. For example, the user can select the number of the number of selectable available storage volumes (e.g., disks) of the silver/tier 3 and/or gold/tier 2 until a number of selected storage volumes satisfy the criteria for the number of CIs (e.g., meets or exceeds that amount of data associated with the number of CIs). In some examples, the user can create a volume group that can include the number of selected storage volumes from the hierarchy of the number of selectable available storage volumes.

In some examples, the processing resources 248-1, 248-2 ... 248-N coupled to the memory resources 250 can execute program instructions to enable the recommend computing device 238 to display, via a graphical user interface 251 coupled the processing resources 248-1, 248-2 ... 248-N, the determined recommendation. In some examples, the graphical user interface 251 can include user interface options (e.g., drop-boxes, menus, selectable tiles, among others) that can enable the user to select the number of selectable available storage volumes. In some examples, a notification can be provided (e.g., via the graphical user display) when the user selects one of the number of selectable available storage volumes from a first available tier rather than selecting one of the number of selectable available storage volumes of a second tier (e.g., which has a lower cost of storage compared to the first tier) when both the first and second tiers are within the current user chargeback level. This can enhance a rate of return (e.g., associated with a plurality of servers) by promoting storage of data at the most appropriate (e.g., cost efficient and/or efficient) location in the plurality of servers.

Alternatively or in addition, in some examples, the graphical user interface can display an override option to enable creation of a volume group without use of the criticality of the number of CIs. For example, utilizing the override option can enable the user to select a number of storage volumes outside the hierarchy of a number of storage volumes. That is, the user can select storage volumes (e.g., disks) from tiers (e.g., tiers below a specified chargeback level) in addition to those corresponding to the present user chargeback level. In some examples, a warning can be displayed (e.g., by the graphical display) that selection of a disk below the current user chargeback level.

In some examples, the processing resources 248-1, 248-2 ... 248-N coupled to the memory resources 250 can execute program instructions to enable the recommend computing device 238 to recommend a change in the chargeback level for an existing volume group when there is a change in environment and/or periodically (e.g., every hour, day, week, and month). In some examples, existing volume group comprises an existing logical volume that can be a plurality of storage volumes. The change of environment can include initial implementation, addition and/or removal of a server to/from the datacenter, and/or when a CI is removed or added, among others.

For example, based on the recommended change in the chargeback level, the chargeback level associated with the number of CIs can be altered (e.g., raised to a higher chargeback level). For example, altering the chargeback level can be performed by an organizational representative and/or a server administrator, among others. An altered chargeback level can enable the processing resources 248-1, 248-2 ... 248-N coupled to the memory resources 250 to execute program instructions to recalculate a storage recommendation based on the altered chargeback level. For instance, a recalculated volume group can be determined such that the volume group can include a logical volume that includes at least a portion of the plurality of available storage volumes based on the recalculated storage recommendation associated with the altered chargeback level.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing.

FIG. 3 illustrates a diagram of an example computing system 338 to provide storage recommendations for datacenters according to the present disclosure. The computing system 338 can comprise processing resources 348-1, 348-2 ... 348-N. The processing resources 348-1, 348-2 ... 348-N can, for example, include the processing resources 248-1, 248-2 ... 248-N described in FIG. 2.

The processing resources 348-1, 348-2 ... 348-N can be communicatively coupled to a CRM 340 via a communication path 344. The CRM 340 can be similar to CRM 240 described in FIG. 2. The CRM 340 can include a number of modules 352, 354, 356, 358, 360. The number of modules can include CRI that can be executed, for example, by the processing resources 348-1, 348-2 ... 348-N to perform a number of functions, as described herein. In some examples, all or a portion of the modules can be executed automatically by the processing resources 348-1, 348-2 . . . 348-N to automatically perform the number of functions, as described herein.

A classify module 352 can, in various examples, include a number of CRI executable by the processing resources 348-1, 348-2 . . . 348-N to perform or achieve the particular act of classifying a plurality of storage mapping systems as a plurality of storage tiers in a datacenter. For example, a first tier (e.g., tier 1) corresponding to XP® and EMC CLARiion®, a second tier corresponding to EVA®, and a third tier corresponding to MSA®. Accordingly, a single tier can include a number of storage mapping systems. This example illustrates the classify module 352 can classify the plurality of storage mapping systems into three tiers, however the present disclose is not limited to such a number of tiers. That is, the classify module 352 can classify the plurality of storage mapping systems into any suitable number of tiers to enable an effective storage recommendation relating to a desired criteria for the recommendation and/or corresponding to a particular datacenter configuration.

A designate module 354 can include a number of instructions that can be executed by the processing resources 348-1, 348-2 . . . 348-N. In various examples, the assign module 354 can assign a chargeback level to each of the plurality of storage tiers. For example, the designate module 354 can designate the first tier to correspond to a high (e.g., a Platinum level associated with a comparatively high cost of storage) chargeback level, the second tier to correspond to a medium (e.g., a Gold level associated with a comparatively intermediate cost of storage) chargeback level, and the third tier to correspond to a low (e.g., a Silver level associated with a comparatively low cost of storage) chargeback level. The number of chargeback levels can be any number of chargeback levels that enables an effective storage recommendation relating to a desired criteria for the recommendation and/or corresponding to a particular datacenter configuration.

An analyze module 356 can include a number instructions that can be executed by the processing resources 348-1, 348-2 . . . 348-N to perform or achieve the particular act of analyzing a plurality of servers in the datacenter, which include a plurality of storage volumes (e.g., disks), to obtain characteristics of each of a plurality of storage volumes. The characteristics, for example, can include a storage mapping system and/or an availability indicator (e.g., Yes/No) for each of the plurality of storage volumes, among others, for example those displayed in Table 1. In some examples, the analyze module 356 can analyze a plurality of cloud servers, as described herein.

TABLE 1

| Server | Disk name | Size | Storage mapping system | Redundancy | Available disk |
|---|---|---|---|---|---|
| 1 | disk 1 | 100 GB | HP XP | 20 | No |
| 1 | disk 2 | 140 GB | EMC CLARiiON | 24 | No |
| 1 | disk 3 | 150 GB | HP MSA | 8 | Yes |
| 1 | disk 4 | 130 GB | HP EVA | 16 | No |
| 1 | disk 5 | 150 GB | HP EVA | 18 | Yes |
| 1 | disk 6 | 50 GB | HP EVA | 10 | Yes |
| 1 | disk 7 | 100 GB | HP XP | 24 | No |
| 1 | disk 8 | 140 GB | HP EVA | 8 | No |
| 1 | disk 9 | 150 GB | HP MSA | 4 | Yes |
| 1 | disk 10 | 130 GB | HP EVA | 12 | No |

Table 1 show an example of the number of the characteristics (e.g., disk name, storage mapping system, etc.) for an individual server (e.g., Server 1). However, the present disclosure is not so limited. That is, the characteristics can include additional characteristics and/or the analyze module 356 can analyze any type and/or number of the plurality of servers to enable an effective storage recommendation relating to a desired criteria for the recommendation and/or corresponding to a particular datacenter configuration (e.g., type and/or number of the plurality of servers).

An assign module 358 can include a number of instructions that can be executed by the processing resources 348-1, 348-2 . . . 348-N. In various examples, the assign module 358 can assign the chargeback level to each of the plurality of storage volumes based on the storage mapping system for each of the plurality of storage volumes. For example, the first tier can be assigned the high (e.g., Platinum) chargeback level, the second tier can be assigned the medium (e.g., Gold) chargeback level, and the third tier can be assigned the low (e.g., silver) chargeback level.

A determine module 360 can include a number of instructions that can be executed by the processing resources 348-1, 348-2 . . . 348-N. In various examples, the determine module 360 can determine a threshold capacity of the number of CIs for each of a plurality of servers and determine a storage recommendation for a number of CIs based on a criticality of the number of CIs, the threshold capacity, and a status of the availability indicator. For example, the criticality can correspond to at least one of the chargeback levels assigned to each of the plurality of storage tiers. The threshold capacity (e.g., 500) can be an upper number of CIs assignable to the number of tiers. The availability indicator can indicate whether or not one of the plurality of storage volumes is available (e.g., whether a disk is currently being used for storage of the number of CIs).

In some examples, the determine module 360 can recommend a hierarchy of a number of available storage volumes based on the chargeback level in an order of cost. For example, the order of cost can be an incrementally increasing cost associated with the plurality of storage tiers.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method, comprising:
classifying, by a processor in a computing system, a plurality of storage mapping systems as a plurality of storage tiers in a datacenter;
designating, by the processor, a chargeback level to each of the plurality of storage tiers to form a cost-based hierarchy of storage tiers, wherein a chargeback level is a rate to obtain access to the storage tier;
analyzing, by the processor, a plurality of storage volumes of a plurality of servers in the datacenter to obtain characteristics of each of the plurality of storage volumes, wherein the characteristics comprise one of the plurality of storage mapping systems;
assigning, by the processor, the chargeback level to each of the plurality of storage volumes based on the storage mapping system for each of the plurality of storage volumes;
determining a criticality of each of a number of configuration items (CIs) by determining a number of business units utilizing the CI and varying the determined criticality based on the determined number of business units; and determining, by the processor, a storage recommendation based on the criticality of each of the CIs, wherein the criticality corresponds to at least one of the chargeback levels assigned to each of the plurality of storage tiers.

2. The method of claim 1, wherein determining the storage recommendation includes recommending a number of available storage volumes of the plurality of servers, wherein the plurality of available storage volumes have the chargeback level equal to or in excess of the criticality of the number of CIs.

3. The method of claim 2, further comprising determining a volume group, wherein the volume group is a logical volume including at least a portion of the plurality of available storage volumes.

4. The method of claim 1, wherein determining the storage recommendation includes recommending a change in the chargeback level for an existing volume group.

5. The method of claim 1, further comprising assigning a threshold capacity of the number of CIs to each of the plurality of servers.

6. The method of claim 1, wherein determining the storage recommendation further includes recommending a hierarchy of a plurality of available storage volumes of the plurality of servers based on the chargeback level.

7. The method of claim 1, further comprising obtaining the characteristics including size and availability of each of the plurality of storage volumes.

8. The method of claim 1, further comprising obtaining the characteristics including redundancy of each of the plurality of storage volumes.

9. The method of claim 1, wherein determining the criticality of each of the number of CIs includes determining a purpose for the CI.

10. The method of claim 1, wherein determining the criticality of each of the number of CIs includes determining a nature of the number of business units utilizing the CI.

11. The method of claim 1, wherein each of the plurality of storage mapping systems is a tiering controller to track data in the plurality of storage volumes.

12. A non-transitory computer readable medium storing a set of instructions executable by a processor to cause a computer to:
classify a plurality of storage mapping systems as a plurality of storage tiers in a datacenter;
designate a chargeback level to each of the plurality of storage tiers to form a cost-based hierarchy of storage tiers, wherein a chargeback level is a rate to obtain access to the storage tier;
analyze a plurality of storage volumes of a plurality of servers in the datacenter to obtain characteristics of each of the plurality of storage volumes, wherein the characteristics comprise a storage mapping system for each of the plurality of storage volumes;
assign a chargeback level to each of the plurality of storage volumes based on the storage mapping system for each of the plurality of storage volumes;
determine a criticality of each of a number of configuration items (CIs) by determining a number of business units utilizing the CI and varying the determined criticality based on the determined number of business units; and
determine a storage recommendation for the number of CIs based on a criticality of each of the number of CIs, wherein the criticality corresponds to at least one of the chargeback levels assigned to each of the plurality of storage tiers, wherein to determine the recommendation includes to determine a hierarchy of a plurality of available storage volumes based on the chargeback level.

13. The medium of claim 12, comprising instructions to display via a graphical user interface the determined recommendation.

14. The medium of claim 13, wherein the graphical user interface further displays an override option to enable creation of a volume group without use of the criticality of the number of CIs.

15. The medium of claim 12, wherein the instructions to determine the storage recommendation include instructions to recommend a change in the chargeback level for an existing volume group, wherein the existing volume group comprises an existing logical volume comprising a plurality of storage volumes.

16. The medium of claim 12, further comprising instructions to assign a threshold capacity of the number of CIs to each of the plurality of servers.

17. A system comprising:
a processing resource in communication with a non-transitory computer readable medium that includes a set of instructions and wherein the processing resource executes the set of instructions to:
classify a plurality of storage mapping systems as a plurality of storage tiers in a datacenter;
designate a chargeback level to each of the plurality of storage tiers to form a cost-based hierarchy of storage tiers, wherein a chargeback level is a rate to obtain access to the storage tier;
analyze a plurality of servers in the datacenter that include a plurality of storage volumes to obtain characteristics of each of a plurality of storage volumes, wherein the characteristics include a storage mapping system and an availability indicator for each of the plurality of storage volumes;
assign the chargeback level to each of the plurality of storage volumes based on the storage mapping system for each of the plurality of storage volumes;
determine a criticality of each of a number of configuration items (CIs) by determining a number of business units utilizing the CI and varying the determined criticality based on the determined number of business units; and
determine a storage recommendation for the number of CIs based on a criticality of each of the number of CIs, and a status of the availability indicator, wherein the criticality corresponds to at least one of the chargeback levels assigned to each of the plurality of storage tiers.

18. The system of claim 17, wherein to determine the recommendation based on the criticality of the number of CIs further includes to recommend a hierarchy of a plurality of available storage volumes based on the chargeback level in an order of respective cost associated with storage and access of data on each of the plurality of available storage volumes.

19. The system of claim 17, wherein the plurality of servers comprise a plurality of cloud servers.

20. The system of claim 17, wherein the number of CIs include at least one of an application, a node, a database, and a processor associated with a number of business units utilizing the datacenter.

* * * * *